(12) United States Patent
Ravipati et al.

(10) Patent No.: US 9,848,388 B1
(45) Date of Patent: Dec. 19, 2017

(54) SYSTEM AND METHOD FOR WIRELESS UPDATES FOR INDUSTRIAL CELLULAR COMMUNICATION DEVICES IN HAZARDOUS LOCATIONS

(71) Applicant: Honeywell International Inc., Morris Plains, NJ (US)

(72) Inventors: Murali Ravipati, Telangana (IN); Murali Krishna Bezawada, Telangana (IN); John Boettger, Rockledge, FL (US); Jayakar Chippada, Telangana (IN); Krishna Kishore Mendi, Telangana (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/190,763

(22) Filed: Jun. 23, 2016

(51) Int. Cl.
*H04W 52/02* (2009.01)
*H04W 76/02* (2009.01)

(52) U.S. Cl.
CPC ....... *H04W 52/028* (2013.01); *H04W 76/028* (2013.01)

(58) Field of Classification Search
CPC combination set(s) only.
See application file for complete search history.

(56) References Cited

U.S. PATENT DOCUMENTS

| | | | |
|---|---|---|---|
| 6,091,337 A | 7/2000 | Arshad et al. | |
| 7,765,559 B2 | 7/2010 | Chichkov et al. | |
| 7,772,720 B2 | 8/2010 | McGee et al. | |
| 8,320,302 B2 | 11/2012 | Richeson et al. | |
| 8,571,608 B2 | 10/2013 | Esnard et al. | |
| 9,198,224 B2 | 11/2015 | Vaglica et al. | |
| 2002/0021242 A1* | 2/2002 | Flick | B60R 25/04 342/357.395 |

(Continued)

FOREIGN PATENT DOCUMENTS

| | | |
|---|---|---|
| CN | 202441542 U | 9/2012 |
| CN | 202631641 U | 12/2012 |
| KR | 101530680 B1 | 6/2015 |

OTHER PUBLICATIONS

Artificial Intelligence—Wikipedia, the free encyclopedia, printed Apr. 13, 2016, 39 pages.

(Continued)

*Primary Examiner* — Junpeng Chen
(74) *Attorney, Agent, or Firm* — Kermit D. Lopez; Luis M. Ortiz; Ortiz & Lopez, PLLC

(57) ABSTRACT

A system and method for updating industrial cellular communications devices. A supercapacitor and a cellular modem are connected electronically to one another. A host can communicate bidirectionally and wirelessly with the cellular modem. A microcontroller is connected electronically with the cellular modem, such that the microcontroller facilitates monitoring with the cellular modem of a voltage and temperature associated with the super capacitor. When the voltage of the super capacitor attains a lower voltage limit, the cellular modem stops receiving data from the host and sends a status code to the host and disconnects a data call and data transfer and enters into a sleep mode during which time the super capacitor is recharged. The cellular modem can reestablish the data call with the host after the super capacitor has been recharged.

20 Claims, 3 Drawing Sheets

(56) References Cited

U.S. PATENT DOCUMENTS

| | | |
|---|---|---|
| 2002/0032047 A1 | 3/2002 | Ingbir |
| 2006/0263649 A1 | 11/2006 | Sohn |
| 2008/0109889 A1 | 5/2008 | Bartels |
| 2013/0090103 A1 | 4/2013 | Kim et al. |
| 2013/0188283 A1 | 7/2013 | Midholm et al. |
| 2014/0231139 A1 | 8/2014 | Rozenblit et al. |
| 2014/0265553 A1 | 9/2014 | McGee |
| 2015/0241566 A1* | 8/2015 | Chakraborty ........... G01S 19/34 |
| | | 342/357.74 |
| 2016/0064155 A1 | 3/2016 | Jiang et al. |

OTHER PUBLICATIONS

What is host?—Definition from WhatIs.com, printed Apr. 12, 2016, 3 pages.
Host (network)—WIkipedia, the free encyclopedia, printed Apr. 12, 2016, 2 pages.
Supercapacitor—Wikipedia, the free encyclopedia, printed Apr. 12, 2016, 49 pages.

* cited by examiner

SYSTEM AND METHOD FOR WIRELESS UPDATES FOR INDUSTRIAL CELLULAR COMMUNICATION DEVICES IN HAZARDOUS LOCATIONS

TECHNICAL FIELD

Embodiments are related to cellular communications and cellular modems and data networks. Embodiments also relate to super capacitors and the monitoring and recharging of electrical components.

BACKGROUND

Electronic devices such as industrial cellular communications devices having intrinsically safe circuits and which are deployed in hazardous areas are experiencing limitations on maximum power draw and energy storage capacity because of the need to avoid sparks and thermal ignitions in such hazardous areas. In addition, cellular communications devices (which are often deployed in hazardous areas) require a high current during active communication, and the cellular device's battery cannot drive the required current under such conditions. A super capacitor in parallel with the battery can be utilized to source the required current, but a limitation here is that the super capacitor recharge time is typically several hours. Additionally, the charge capacity of a super capacitor drastically reduces at negative temperatures, which results in limiting short duration cellular calls. Due to short duration call limitations, data uploads and downloads to target devices utilizing cellular media require several recharge cycles to the super capacitor, which worsens at negative temperature.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved and safe cellular communications for cellular communications devices utilized in hazardous locations.

It is another aspect of the disclosed embodiments to provide for the use of a super capacitor in an industrial cellular communications device.

It is also an aspect of the disclosed embodiments to provide for the monitoring of voltage and temperature in a cellular communications device having a super capacitor.

It is still another aspect of the disclosed embodiments to provide for a method and system of establishing data calls for data transfers between cellular communications devices and a host.

The aforementioned aspects and other objectives and advantages can now be achieved as described herein. A system and method for updating industrial cellular communications devices is described herein. In an example embodiment, a super capacitor and a cellular modem are connected electronically to one another. A host can communicate bidirectionally and wirelessly with the cellular modem. A microcontroller is connected electronically with the cellular modem, such that the microcontroller facilitates monitoring with the cellular modem of a voltage associated with the super capacitor and a temperature associated with the cellular modem. When the voltage of the super capacitor attains a lower voltage limit, the cellular modem stops receiving data from the host and sends a status code to the host and disconnects a data call and data transfer and enters into a sleep mode during which time the super capacitor is recharged. The cellular modem can reestablish the data call with the host after the super capacitor has been recharged.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout. As used herein, the term "and/or" includes any and all combinations of one or more of the associated listed items.

Figure 1:
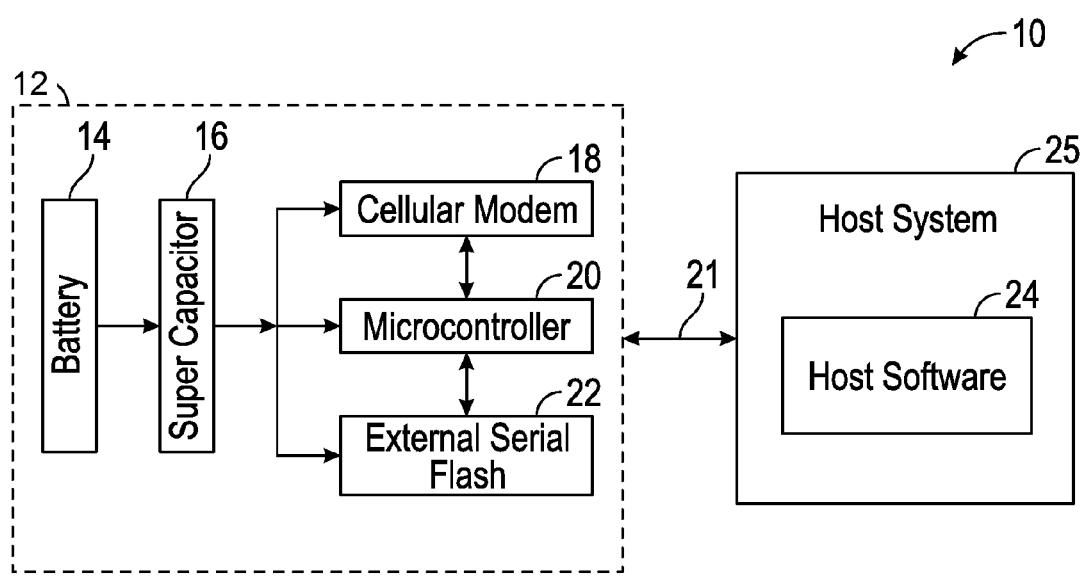
FIG. 1 illustrates a block diagram of a system for performing over the air updates for industrial cellular communications devices utilized in hazardous locations, in accordance with an example embodiment.

FIG. 1 illustrates a block diagram of a system 10 for performing over the air updates for industrial cellular communications devices utilized in hazardous locations, in accordance with an example embodiment. System 10 illustrates a preferred embodiment and generally includes a cellular communications device 12 configured with a cellular modem 18, a microcontroller 20, and an external serial Flash memory 22. The cellular modem 18 can communicate bidirectionally with the microcontroller 20 and the Flash memory 22. Host software 24 maintained by a host system 25 (also referred to as a "host") can be utilized to establish a data call with the cellular modem 18 for over the air updates and data transfer operations. The arrow 21 depicted in FIG. 1 represents data communications between the host system 25 and the cellular communications device 12. The data communications may be, for example, packet-based wireless data communications such as, for example, cellular communications, WiFi, and/or other wireless data communications.

The cellular communications device 12 can be further configured to include a super capacitor 16 and a battery 14. The cellular modem 18 can monitor the voltage of the super capacitor 16 and the temperature within the cellular modem 18. When the voltage attains a lower voltage limit, the cellular modem 18 can stop receiving data by sending a status code to a host and disconnecting the call gracefully and then enter into a sleep mode. After the super capacitor 16 recharges, the cellular modem 18 can reestablish a data call with the host to transmit and receive data. Intelligence functionality can be employed to handle abrupt data call disconnections.

Note that the term "host" as utilized herein can have several meanings. For example, the term "host" in the context of Internet protocol specifications may refer to any computer that has a full two-way access to other computers on the Internet. In this example, the host may have a specific "local or host number" that, together with the network number, forms its unique IP address. If point-to-point protocol is used to access the access provider, a unique IP address may be utilized for the duration of any connection made to the Internet and the computer is a host for that period. In this context, a "host" can be considered a node in a network.

A network host is a computer or other device connected to a computer network. A network host may offer information resources, services, and applications to users or other nodes on the network. A network host is a network node that is assigned a network layer host address.

Computers participating in networks that use the internet Protocol Suite may also be called IP hosts. Specifically, computers participating in the Internet are called Internet hosts, sometimes Internet nodes. Internet hosts and other IP hosts have one or more IP addresses assigned to their network interfaces. The addresses are configured either manually by an administrator, automatically at start-up by means of the Dynamic Host Configuration Protocol (DHCP), or by stateless address auto configuration methods.

Every network host is a physical network node (i.e., a network device), but not every physical network node is a host. Network devices such as modems, hubs, and network switches are not assigned host addresses (except sometimes for administrative purposes), and are consequently not considered to be network hosts. Devices such as network printers and hardware routers have IP addresses, but since they are not general-purpose computers, they are sometimes not considered to be hosts. Network hosts that participate in applications that use the client-server model of computing are classified as server and/or client. Network hosts may also function as nodes in peer-to-peer applications, in which all nodes share and consume resources in the same manner.

The solution of system 10 depicted in FIG. 1 has various functionalities. For example, system 10 can establish a data call between the host system 25 and the cellular modem 18. The host software 24 can establish a network connection with the cellular modem 18, which accepts the data transmission if super capacitor voltage is at a certain voltage limit. The system 10 also allows for monitoring of the super capacitor voltage and temperature conditions. The cellular modem 18 and the microcontroller 20 can continuously monitor the super capacitor voltage and ambient temperature and calculate the charge, and this information can be utilized to determine whether or not to continue the data call.

The system 10 can also facilitate piece wise data transfer in multiple sessions based on the super capacitor voltage. Due to charge limitations in the super capacitor 16 at negative temperatures, the cellular modem 18 will send a status to each packet received from the host software 25. If the super capacitor voltage is low, a low voltage status can be sent to the host software 24 to stop the data connection and allow the super capacitor 16 to recharge. The cellular modem 18 can reestablish the data call with the host software 24 after the super capacitor recharges from the battery 14. The host system or host 25 can again start sending data to the cellular modem 18. The entire data transfer may take several charge cycles.

Additionally, an intelligence functionality can be incorporated into system 10 to handle abrupt data call disconnections. For example, such an intelligence functionality can be provided as an AI (Artificial Intelligence) module as part of the host software 24 and/or as a module associated with the cellular modem 18 and/or microcontroller 20. An example of a module that can be configured as an AI module is module 452 shown in FIG. 4 and discussed in greater detail herein. Such an AI module can include AI instructions, for example, which implements a classifier and/or a controller and/or a machine-learning module. Other examples of AI modules include neural network, deep neural network, deep learning applications, and so on.

A classifier is probably the simplest type of AI module that can be adapted for use with system 10 with the host software 24 and/or other modules (e.g., associated with the cellular modem, the microcontroller, and so on). Such a classifier can utilize pattern matching to determine a closes match and can be tuned according to examples known as observations or patterns. In supervised learning, for example, each pattern belongs to a certain predefined class. A class can be seen as a decision that has to be made. All the observations combined with their class labels are known as a data set. When a new observation is received, that observation is classified based on previous experience.

Due to limitations of super capacitor charge at negative temperatures, there is a chance of abrupt disconnection of data calls. The cellular modem 18 can store important parameters such as, for example, the last data packet ID, a host IP address, and a port number. Utilizing such data, the cellular modem 18 reestablishes a call with the host 25 and reinitiates the data transfer.

The super capacitor 16 (also referred to as an ultra capacitor or electric double-layer capacitor) can be implemented as a high-capacity electrochemical capacitor with capacitance values having much higher than other capacitors (but lower voltage limits) that bridge the cap between electrolytic capacitors and rechargeable batteries. The super capacitor 16 typically stores 10 to 100 times more energy per unit volume or mass than electrolytic capacitors, can accept and deliver charges much faster than batteries, and tolerates more charge and discharge cycles than rechargeable batteries.

The super capacitor 16 may be, for example, 10 times larger than conventional batteries for a given charges. Super capacitors such as the super capacitor 16 can be utilized in applications requiring many rapid charge/discharge cycles rather than long term compact energy storage: within cars, buses, trains, cranes, and elevators, where they are used for regenerative braking, short-term energy storage, or burst-mode power delivery. Smaller units, for example, can be utilized as memory backup for SRAM (Static Random-Access Memory).

Figure 2:
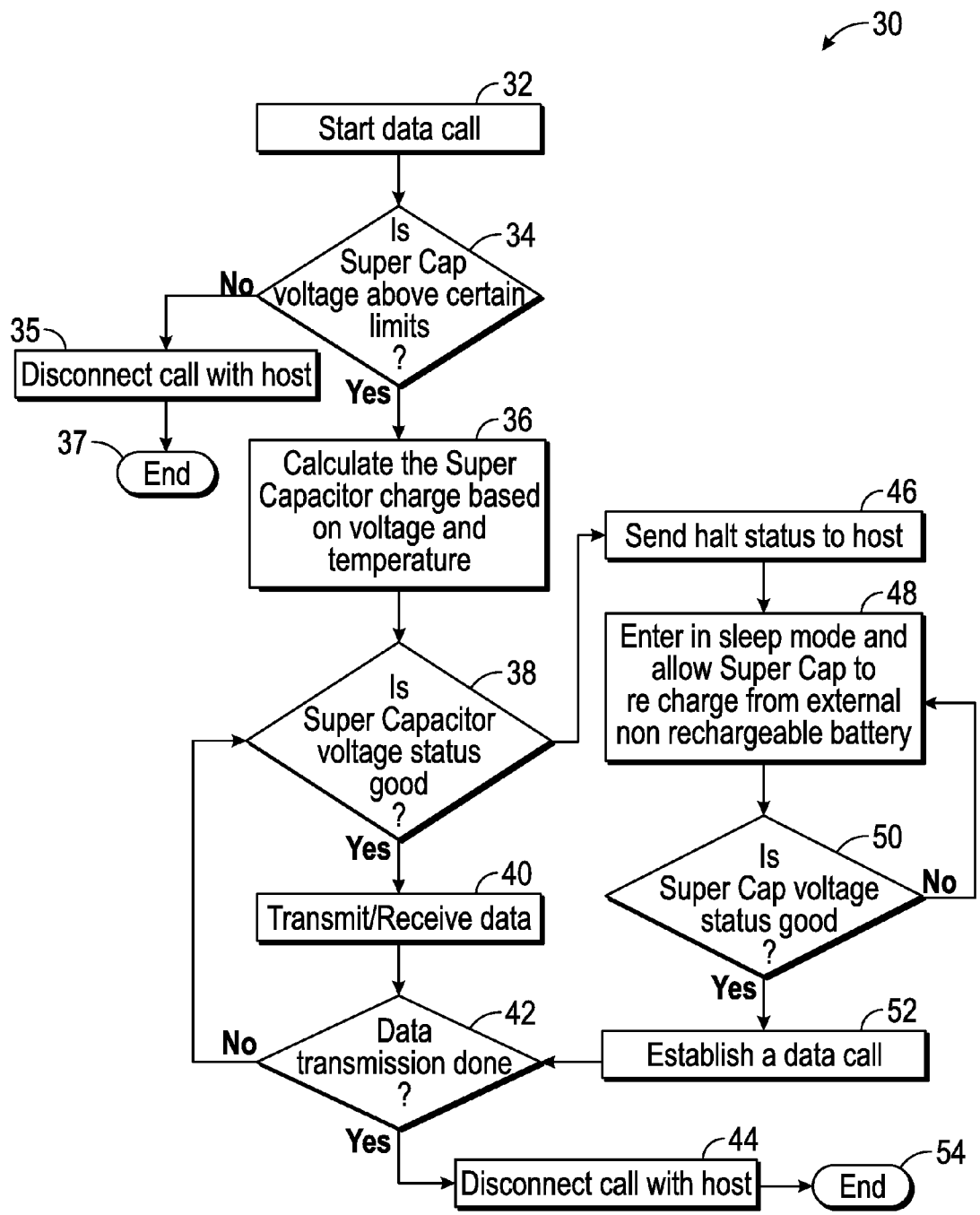
FIG. 2 illustrates a flow chart of operations depicting logical operational steps of a method for performing over the air updates for industrial cellular communications devices utilized in hazardous locations, in accordance with an example embodiment.
Figure 3:
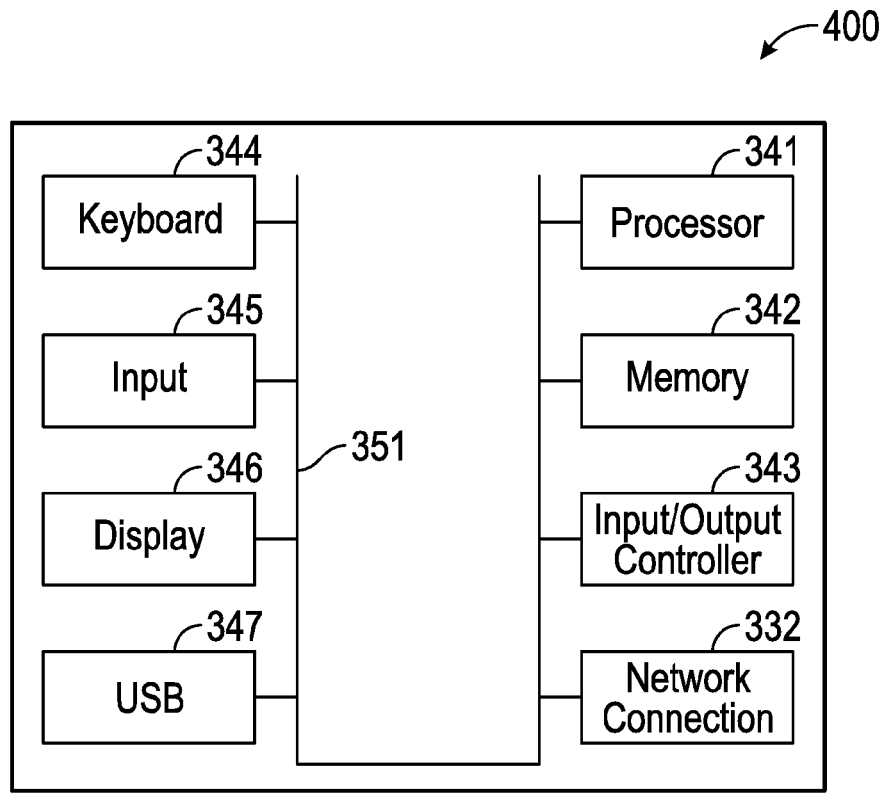
FIG. 3 illustrates a block diagram of a data-processing apparatus or system that can be adapted for use in accordance with one or more example embodiments.
Figure 4:
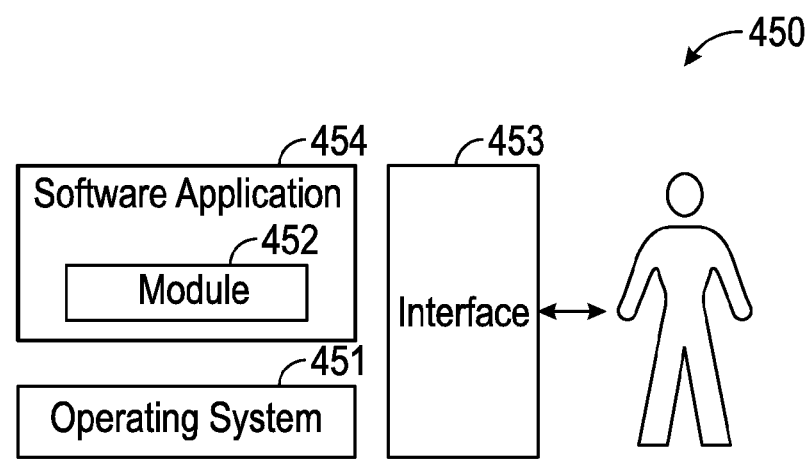
FIG. 4 illustrates a schematic view of a software system including a module, an operating system, and a user interface, in accordance with an example embodiment.

FIG. 2 illustrates a flow chart of operations depicting logical operational steps of a method 30 for performing over the air updates for industrial cellular communications devices utilized in hazardous locations, in accordance with an example embodiment. As will be explained in greater detail herein with respect to FIGS. 3-4, the various instructions/operations of method 30 depicted in FIG. 2 can be implemented via a data-processing apparatus or system such as shown in FIGS. 3-4.

As indicated at block 32, a data call can begin. Then, as illustrated at decision block 34, a test can be implemented to determine if the voltage of the super capacitor 16 is above certain limits. If not, then the operations depicted at blocks 35 and 37 are implemented. That is, as shown at block 35 the call can be disconnected with the host 25 and then as indicated at block 37, the process terminates.

Assuming that the answer is "yes" with respect to the operation depicted at decision block 34, the super capacitor charge can then be calculated based on voltage and temperature, as illustrated at block 36. Thereafter, as shown at decision block 38, a test can be implemented to determine if the super capacitor status is good. If not, then as indicated at block 46, a halt status notification is sent to the host 25. Then, as described at block 48, the cellular communications device 12 can be instructed to enter into a sleep mode and the super capacitor 16 is allowed to recharge from an external non-rechargeable battery.

Following processing of the operation shown at block 48, a test can be implemented to determine if the super capacitor voltage is good, as shown at decision block 50. If the answer is "no," then the operation depicted at block 48 is repeated. If the answer is "yes," then as shown at block 52, a data call can be established. Following processing of the operation shown at block 52, a test can be implemented as illustrated at block 42 to determine if the data transmission is complete. If the answer is "yes," then the call with the host 25 is disconnected, as described at block 44, and the process then ends, as depicted at block 54. If the answer with respect to the operation shown at decision block 42 is "no," then the test depicted at decision block 38 is repeated. If the answer with respect to the operation shown at decision block 38 is "yes," then an operation to transmit and/or receive data can be implemented, as depicted at block 40. The data transmission testing operation depicted at decision block 42 can then be repeated followed by other subsequent operations and so on.

Note that in some embodiments, computer program code for carrying out operations of the disclosed embodiments such as those shown in FIG. 2 may be written in an object oriented programming language (e.g., Java, C#, C++, etc.). Such computer program code, however, for carrying out operations of particular embodiments can also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wi-Fi, Wimax, IEEE 802.xx, and cellular network, or the connection may be made to an external computer via most third party supported networks (e.g., through the Internet via an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

FIGS. 3-4 are provided as exemplary diagrams of data-processing environments in which embodiments may be implemented. It should be appreciated that FIGS. 3-4 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 3, some embodiments may be implemented in the context of a data-processing system 400 that includes one or more processors such as processor 341. System 400 also includes a memory 342, a controller 343 (e.g., an input/output controller), a peripheral USB (Universal Serial Bus) connection 347, a keyboard 344 (e.g., a physical keyboard or a touch screen graphically displayed keyboard), an input component 345 (e.g., a pointing device, such as a mouse, track ball, pen device, which may be utilized in association or with the keyboard 344, etc.), a display 346, and in some cases, a network connection 332 to a network such as a bidirectional packet based computer network or wireless network (e.g., cellular communications network, etc.). In some embodiments, the network connection 332 may be, for example, a cellular modem such as the cellular modem 18 shown in FIG. 1.

Data-processing system 400 may be, for example, a client computing device (e.g., a client PC, laptop, tablet computing device, etc.), which communicates with peripheral devices (not shown) via a client-server network (e.g., wireless and/or wired). In another embodiment, the data-processing system may be a server in the context of a client-server network or other server-based network implementation.

As illustrated, the various components of data-processing system 400 can communicate electronically through a system bus 351 or other similar architecture. The system bus 351 may be, for example, a subsystem that transfers data between, for example, computer components within data-processing system 400 or to and from other data-processing devices, components, computers, etc. Data-processing system 400 may be implemented as, for example, a server in a client-server based network (e.g., the Internet) or can be implemented in the context of a client and a server (i.e., where aspects are practiced on the client and the server). Data-processing system 400 may be, for example, a stand-alone desktop computer, a laptop computer, a Smartphone, a pad computing device, a server, and so on.

FIG. 4 illustrates a computer software system 450 for directing the operation of the data-processing system 400 shown in FIG. 3. Software application 454, stored for example in the memory 342 of FIG. 3, generally includes the module 452 shown in FIG. 4. The system 450 further includes a kernel or operating system 451 and a shell or interface 453. One or more application programs, such as software application 454, may be "loaded" (i.e., transferred from, for example, memory 342 or another memory location) for execution by the data-processing system 400. The data-processing system 400 can receive user commands and data through the interface 453; these inputs may then be acted upon by the data-processing system 400 in accordance with instructions from operating system 451 and/or software application 454. The interface 453, in some example embodiments, can serve to display results, whereupon a user may supply additional inputs or terminate a session.

The software application 454 can include one or more modules such as, for example, a module 452 (or a module composed of a group of modules), which can, for example, implement instructions or operations such as those described herein. Examples of instructions that can be implemented by module 452 include steps or operations such as those shown and described herein with respect to the various blocks and operations shown in FIG. 2 and described elsewhere herein.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" such as module 452 shown in FIG. 4 constitutes a software application. However, a module may also be composed of, for example, electronic and/or computer hardware or such hardware in combination with software. In some cases, a "module" can also constitute a database and/or electronic hardware and software that interact with such a database.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein can refer to a collection of routines and data structures that perform a particular task or implement a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. Thus, the instructions or steps such as those shown in FIG. 2, for example, and discussed elsewhere herein can be implemented in the context of such a module or modules, sub-modules, and so on.

FIGS. 3-4 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including, for example, Windows, Macintosh, UNIX, LINUX, and the like.

Based on the foregoing, it can be appreciated that a number of example embodiments are disclosed herein. For example, in one embodiment, a system for updating an industrial cellular communications device can be implemented. Such a system can include a super capacitor and a cellular modem that is connected electronically to the super capacitor. A host can communicate bidirectionally and wirelessly with the cellular modem over a packet based wireless communications. A microcontroller can be connected electronically with the cellular modem, wherein the microcontroller facilitates monitoring with the cellular modem of a voltage associated with the super capacitor and a temperature associated with the cellular modem. The host can establish a data call with the cellular modem. Such a data call can be composed of a data transfer between the host and the cellular modem. Additionally, when the voltage associated with the super capacitor attains a lower voltage limit, the cellular modem can stop receiving data and send a status code to the host and disconnect the data call and the data transfer and enter into a sleep mode during which time the super capacitor is recharged and wherein the cellular modem reestablishes the data call with the host after the super capacitor has been recharged.

In some example embodiments, the microcontroller can communicate electronically with the cellular modem. Additionally, in some example embodiments, the host software associated with the host can established the data call between the host and the cellular modem. In some example embodiments, the microcontroller can be configured to continuously monitor the voltage associated with the super capacitor and an ambient temperature and calculate a charge associated with the super capacitor to facilitate a decision as to whether to continue the data call. In another example embodiment, the data transfer can involve a piece wise data transfer across multiple sessions based on the voltage associated with the super capacitor. In yet another example embodiments, the cellular modem can store parameters including at least one of: a last data packet ID, a host IP address, and/or a port number. The cellular modem can utilize such example parameters for reestablishing the data call with the host to reinitiate the data transfer.

In yet another example embodiment, a system can be implemented for updating an industrial cellular communications device. Such a system can include, for example, a rechargeable battery and a cellular modem that is connected electronically to the rechargeable battery; a host that communicates bidirectionally and wirelessly with the cellular modem over a packet based wireless communications; and a microcontroller that is connected electronically with the cellular modem, wherein the microcontroller facilitates monitoring with the cellular modem of a voltage associated with the rechargeable battery and a temperature associated with the cellular modem, wherein the host establishes a data call with the cellular modem, the data call composed of a data transfer between the host and the cellular modem, and wherein when the voltage associated with the rechargeable battery attains a lower voltage limit, the cellular modem stops receiving data and sends a status code to the host and disconnects the data call and data transfer and enters into a sleep mode during which time the rechargeable battery is recharged and wherein the cellular modem reestablishes the data call with the host after the rechargeable battery has been recharged.

In yet another example embodiment, a method for updating an industrial cellular communications device can be implemented. Such a method can includes steps or instructions/operations such as, for example, electronically connecting a super capacitor or a rechargeable to a cellular modem; bidirectionally and wirelessly communicating between a host and the cellular modem over a packet based wireless communications; and electronically connecting a microcontroller with the cellular modem, wherein the microcontroller facilitates monitoring with the cellular modem of a voltage associated with the super capacitor and a temperature associated with the cellular modem, wherein the host establishes a data call with the cellular modem, the data call composed of a data transfer between the host and the cellular modem, and wherein when the voltage associated with the super capacitor or the rechargeable battery attains a lower voltage limit, the cellular modem stops receiving data and sends a status code to the host and disconnects the data call and data transfer and enters into a sleep mode during which time the super capacitor or the rechargeable battery is recharged and wherein the cellular modem reestablishes the data call with the host after the super capacitor has been recharged.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A system for updating an industrial cellular communications device, said system comprising:
   a super capacitor and a cellular modem that is connected electronically to said super capacitor, wherein said cellular modem receives input from said super capacitor;
   an external serial Flash component that receives input from said super capacitor;
   a host that communicates bidirectionally and wirelessly with said cellular modem over a packet based wireless communications; and
   a microcontroller that is connected electronically with said cellular modem and which communicates bidirectionally with said cellular modem and receives input from said super capacitor and wherein said microcontroller further communicates bidirectionally with said external serial Flash component, wherein said microcontroller facilitates monitoring with said cellular modem of a voltage associated with said super capacitor and a temperature associated with said cellular modem, wherein said host establishes a data call with said cellular modem, said data call composed of a data transfer between said host and said cellular modem, and wherein when said voltage associated with said super capacitor attains a lower voltage limit, said cellular modem stops receiving data and sends a status code to said host and disconnects said data call and data transfer and enters into a sleep mode during which time said super capacitor is recharged and wherein said cellular modem reestablishes said data call with said host after said super capacitor has been recharged.

2. The system of claim 1 further comprising a microcontroller that communicates electronically with said cellular modem.

3. The system of claim 1 wherein host software associated with said host establishes said data call between said host and said cellular modem.

4. The system of claim 2 wherein said microcontroller continuously monitors said voltage associated with said super capacitor and an ambient temperature and calculates a charge associated with said super capacitor to facilitate a decision as to whether to continue said data call.

5. The system of claim 1 wherein said data transfer comprises a piece wise data transfer across multiple sessions based on said voltage associated with said super capacitor.

6. The system of claim 1 wherein said cellular modem stores parameters including a last data packet ID, a host IP address, and a port number.

7. The system of claim 6 wherein said cellular modem utilizes said parameters for reestablishing said data call with said host to reinitiate said data transfer.

8. The system of claim 7 wherein said reestablishing said data call occurs from said host.

9. The system of claim 7 wherein said reestablishing said data call occurs from said industrial cellular communications device.

10. A system for updating an industrial cellular communications device, said system comprising:
   a rechargeable battery and a cellular modem that is connected electronically to said rechargeable battery;
   an external serial Flash component that receives input from said rechargeable battery via a super capacitor;
   a host that communicates bidirectionally and wirelessly with said cellular modem over a packet based wireless communications; and
   a microcontroller that communicates bidirectionally with said cellular modem and said external serial Flash component, and wherein said microcontroller is connected electronically with said cellular modem, wherein said microcontroller facilitates monitoring with said cellular modem of a voltage associated with said rechargeable battery and a temperature associated with said cellular modem, wherein said host establishes a data call with said cellular modem, said data call composed of a data transfer between said host and said cellular modem, and wherein when said voltage associated with said rechargeable battery attains a lower voltage limit, said cellular modem stops receiving data and sends a status code to said host and disconnects said data call and data transfer and enters into a sleep mode during which time said rechargeable battery is recharged and wherein said cellular modem reestablishes said data call with said host after said rechargeable battery has been recharged.

11. The system of claim 10 further comprising a microcontroller that communicates electronically with said cellular modem.

12. The system of claim 10 wherein host software associated with said host establishes said data call between said host and said cellular modem.

13. The system of claim 11 wherein said microcontroller continuously monitors said voltage associated with said super capacitor and an ambient temperature and calculates a charge associated with said super capacitor to facilitate a decision as to whether to continue said data call.

14. The system of claim 10 wherein said data transfer comprises a piece wise data transfer across multiple sessions based on said voltage associated with said super capacitor.

15. The system of claim 10 wherein said cellular modem stores parameters including a last data packet ID, a host IP address, and a port number.

16. The system of claim 10 wherein said cellular modem utilizes said parameters for reestablishing said data call with said host to reinitiate said data transfer.

17. The system of claim 16 wherein said reestablishing said data call occurs from said host.

18. The system of claim 17 wherein said reestablishing said data call occurs from said industrial cellular communications device.

19. A method for updating an industrial cellular communications device, said method comprising:
   electronically connecting a super capacitor or a rechargeable to a cellular modem;
   providing an external serial Flash component that receives input from said super capacitor;
   bidirectionally and wirelessly communicating between a host and said cellular modem over a packet based wireless communications; and
   electronically connecting a microcontroller with said cellular modem, wherein said microcontroller facilitates monitoring with said cellular modem of a voltage associated with said super capacitor and a temperature associated with said cellular modem, and wherein said microcontroller communicates bidirectionally with said external serial Flash component and said cellular modem, wherein said host establishes a data call with said cellular modem, said data call composed of a data transfer between said host and said cellular modem, and wherein when said voltage associated with said super capacitor or said rechargeable battery attains a lower voltage limit, said cellular modem stops receiving data and sends a status code to said host and disconnects said data call and data transfer and enters into a sleep mode during which time said super capacitor or said rechargeable battery is recharged and wherein said cellular modem reestablishes said data call with said host after said super capacitor has been recharged.

20. The method of claim 19 further comprising a microcontroller that communicates electronically with said cellular modem and wherein host software associated with said host establishes said data call between said host and said cellular modem and wherein said cellular modem stores parameters including a last data packet ID, a host IP address, and a port number.

* * * * *